(12) United States Patent
Yamakawa et al.

(10) Patent No.: US 11,173,616 B2
(45) Date of Patent: Nov. 16, 2021

(54) GRIPPING MECHANISM THAT GRIPS AND RELEASES COMPONENT, AND ASSEMBLY DEVICE

(71) Applicant: KYOCERA Document Solutions Inc., Osaka (JP)

(72) Inventors: Tomohiko Yamakawa, Osaka (JP); Masaru Takagi, Osaka (JP); Koji Izumi, Osaka (JP); Hayato Mori, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 52 days.

(21) Appl. No.: 16/695,853

(22) Filed: Nov. 26, 2019

(65) Prior Publication Data

US 2020/0164524 A1    May 28, 2020

(30) Foreign Application Priority Data

Nov. 27, 2018   (JP) .............................. JP2018-221717

(51) Int. Cl.
*B25J 15/00*       (2006.01)
(52) U.S. Cl.
CPC ................................ *B25J 15/0038* (2013.01)
(58) Field of Classification Search
CPC ........... B25J 9/04; B25J 15/0038; B66C 1/38; B66C 1/442; B66C 1/48
USPC ..................................... 248/316.3; 294/102.1
See application file for complete search history.

(56) References Cited

U.S. PATENT DOCUMENTS

| 110,725 | A | * | 1/1871 | Barstow | .................... | B62C 9/00 |
| | | | | | | 280/184 |
| 1,417,009 | A | * | 5/1922 | William | ............... | A47G 25/487 |
| | | | | | | 223/91 |
| 3,008,749 | A | * | 11/1961 | Gowan | .................... | B66C 1/48 |
| | | | | | | 294/86.4 |
| 3,653,708 | A | | 4/1972 | Merola | | |

(Continued)

FOREIGN PATENT DOCUMENTS

| GB | 1305733 A | 2/1973 |
| JP | H07-241733 A | 9/1995 |

OTHER PUBLICATIONS

The first office action in CN mailed by SIPO (State Intellectual Property office) dated Dec. 1, 2020 in the corresponding Chinese Patent Application No. 201911132572.4.

*Primary Examiner* — Saul Rodriguez
*Assistant Examiner* — Brendan P Tighe
(74) *Attorney, Agent, or Firm* — IP Business Solutions, LLC

(57) ABSTRACT

A gripping mechanism includes an inclined surface, a rolling element, and a facing gripping part. The inclined surface is a surface inclined to a vertical direction. The rolling element freely rolls obliquely upward and downward on the inclined surface. The facing gripping part is arranged to face the inclined surface and forms an opening space with an end of the inclined surface, the opening space being narrower than a diameter of the rolling element. The rolling element includes: a core member forming a core of the rolling element; an annular member that is provided around the core member and has elasticity; and a plurality of ribs each of which is interposed between an outer periphery of the core member and an inner periphery of the annular member, and forms a gap between the core member and the annular member.

5 Claims, 11 Drawing Sheets

(56) References Cited

U.S. PATENT DOCUMENTS

| | | | | |
|---|---|---|---|---|
| 3,780,923 A | * | 12/1973 | Merola | B25B 1/2473 |
| | | | | 226/151 |
| 4,831,693 A | * | 5/1989 | Veith | B25B 5/006 |
| | | | | 24/530 |
| 5,000,653 A | * | 3/1991 | Gosdowski | B25J 9/042 |
| | | | | 414/744.5 |
| 2015/0251493 A1 | * | 9/2015 | Ma | B60B 9/04 |
| | | | | 152/80 |

* cited by examiner

GRIPPING MECHANISM THAT GRIPS AND RELEASES COMPONENT, AND ASSEMBLY DEVICE

INCORPORATION BY REFERENCE

This application claims priority to Japanese Patent Application No. 2018-221717 filed on Nov. 27, 2018, the entire contents of which are incorporated by reference herein.

BACKGROUND

The present disclosure relates to gripping mechanisms that grip and release components, and assembly devices. Particularly, the present disclosure relates to a technique for gripping and releasing a component having an upward protrusion.

A general assembly device uses a chuck mechanism including a pair of chuck claws that grips and releases a component. In such assembly device, a component is gripped by the pair of chuck claws of the chuck mechanism, the chuck mechanism is conveyed to a predetermined position together with the component, and the component is released from the pair of chuck claws at the predetermined position.

SUMMARY

A technique improved over the aforementioned technique is proposed as one aspect of the present disclosure.

A gripping mechanism according to the one aspect of the present disclosure includes an inclined surface, a rolling element, and a facing gripping part. The inclined surface is a surface inclined to a vertical direction. The rolling element freely rolls obliquely upward and downward on the inclined surface. The facing gripping part is arranged to face the inclined surface and forms an opening space with an end of the inclined surface, the opening space being narrower than a diameter of the rolling element. The rolling element includes: a core member forming a core of the rolling element; an annular member that is provided around the core member and has elasticity; and a plurality of ribs each of which is interposed between an outer periphery of the core member and an inner periphery of the annular member, and forms a gap between the core member and the annular member.

An assembly device of another aspect of the present disclosure includes the gripping mechanism described above, and a driving member that moves the gripping mechanism to the vertical direction and to a direction orthogonal to the vertical direction.

DETAILED DESCRIPTION

Hereinafter, a description will be given of, with reference to the drawings, a gripping mechanism and an assembly device according to one embodiment of the present disclosure.

Figure 1:
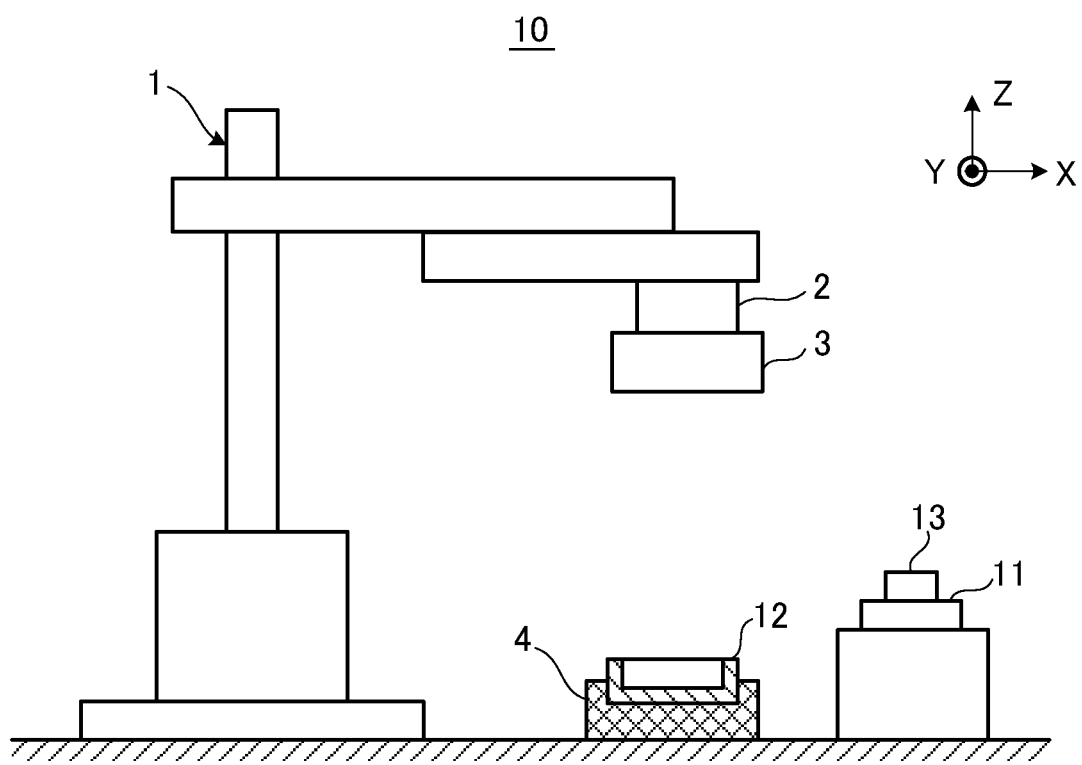
FIG. 1 is a side view schematically showing an assembly device according to one embodiment of the present disclosure.
Figure 2:
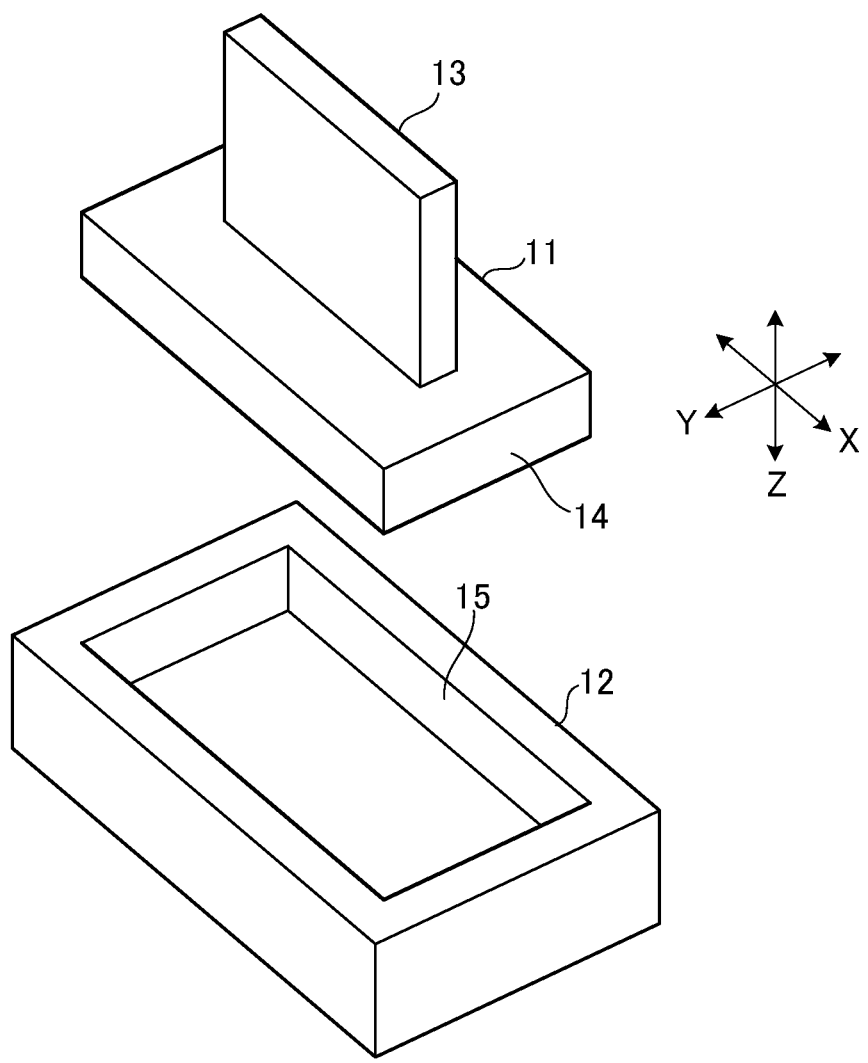
FIG. 2 is a perspective view showing a first component and a second component that are to be assembled by the assembly device according to the present embodiment.
Figure 3A:
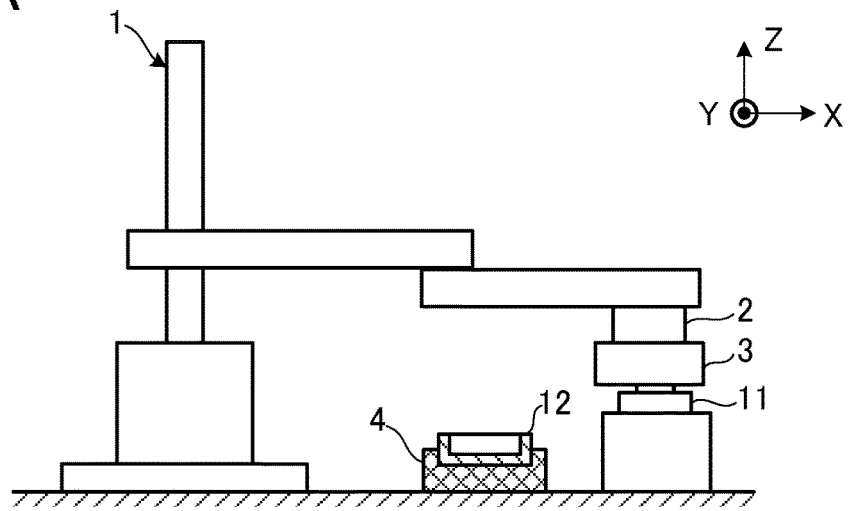
FIG. 3A, FIG. 3B, and FIG. 3C are side views each showing an operating condition of the assembly device according to the present embodiment.
Figure 3B:
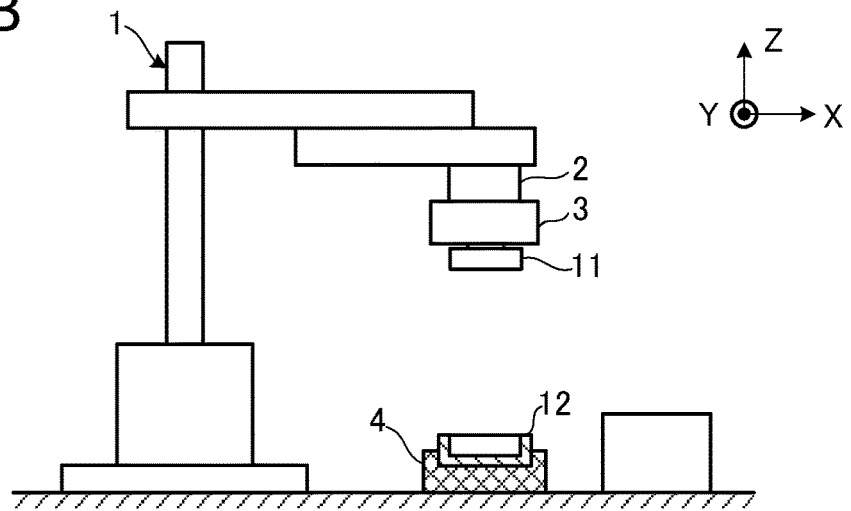
Figure 3C:
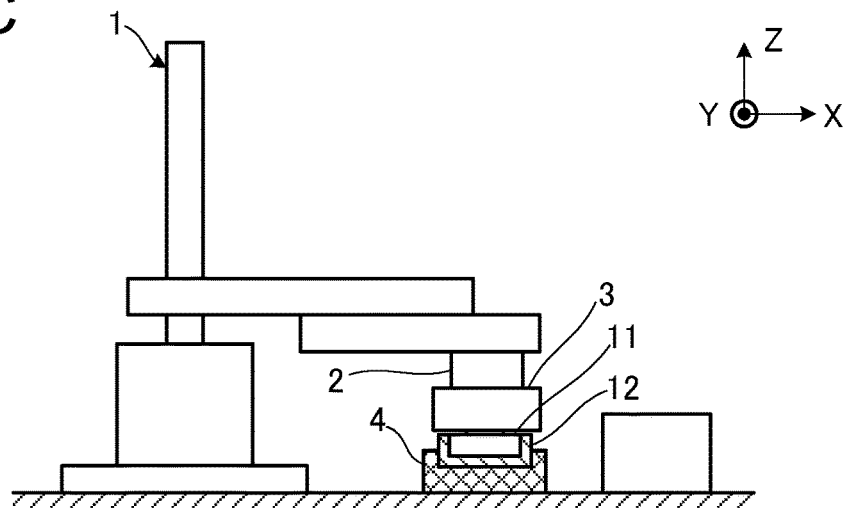

FIG. 1 is a side view schematically showing an assembly device 10 according to one embodiment of the present disclosure. FIG. 2 shows a first component and a second component that are to be assembled by the assembly device 10 according to the present embodiment. FIG. 3A, FIG. 3B, and FIG. 3C are side views each showing an operating condition of the assembly device 10 according to the present embodiment. FIG. 1 to FIG. 3C indicate an up-down direction (a direction parallel with a vertical direction) Z, a lateral direction (a right-left direction) X orthogonal to the vertical direction, and an longitudinal direction (a front-back direction) Y orthogonal to the vertical direction. In addition, FIG. 4 to FIG. 8 to be described later indicate the up-down direction Z, the lateral direction X, and the longitudinal direction Y.

As shown in FIG. 1, the assembly device 10 according to the present embodiment includes a robot 1, a positional deviation correcting device 2 attached to a tip of an arm of the robot 1, and a gripping mechanism 3 supported by the positional deviation correcting device 2. A positioning mechanism 4 is disposed at a position having preset relation with the robot 1. A first component 11 is disposed at a position having a specific positional relation with the robot 1. A second component 12 is positioned by the positioning mechanism 4.

The robot 1 moves the positional deviation correcting device 2 and the gripping mechanism 3 to the up-down direction Z, the lateral direction X, and the longitudinal direction Y. The positional deviation correcting device 2 corrects a position of the gripping mechanism 3. The gripping mechanism 3 grips a protrusion part 13 of the first component 11, and releases the gripping. The robot 1 is one example of the driving member recited in What is claimed is.

As shown in FIG. 2, the first component 11 is provided with a convex part 14 and the protrusion part 13 projected upwardly from the convex part 14. The second component 12 is provided with a recess part 15 into which the convex part 14 of the first component 11 is fitted.

As shown in FIG. 3A, the robot 1 moves the positional deviation correcting device 2 and the gripping mechanism 3 to the lateral direction X and the longitudinal direction Y, positions the gripping mechanism 3 above the first component 11, then, moves the positional deviation correcting device 2 and the gripping mechanism 3 to the down direction of the direction Z, so as that the gripping mechanism 3 abuts the protrusion part 13 of the first component 11. The gripping mechanism 3 grips the protrusion part 13 of the first component 11. Description will be given later for gripping of the protrusion part 13 of the first component 11 by the gripping mechanism 3.

As shown in FIG. 3B, the robot 1 then moves the positional deviation correcting device 2 and the gripping mechanism 3 to the up direction of the direction Z, lifts up the first component 11, moves the positional deviation correcting device 2 and the gripping mechanism 3 to the lateral direction X and the longitudinal direction Y, and positions the gripping mechanism 3 directly above the second component 12. Thereafter, as shown in FIG. 3C, the robot 1 moves the positional deviation correcting device 2 and the gripping mechanism 3 to the down direction of the direction Z, so as that the convex part 14 of the first component 11 fits into the recess part 15 of the second component 12. At this time, the positional deviation correcting device 2 detects a direction of the force acting on the first component 11, and adjust the position of the gripping mechanism 3 in accordance with the direction of the force to thereby correct positional deviation of the convex part 14 of the first component 11, the deviation being with respect to the recess part 15 of the second component 12. Thereby, the convex part 14 can be fitted into the recess part 15.

Furthermore, the robot 1 moves the positional deviation correcting device 2 and the gripping mechanism 3 to the left (or to right) of the lateral direction X, so as that the protrusion part 13 of the first component 11 is released from the gripping mechanism 3, and moves the positional deviation correcting device 2 and the gripping mechanism 3 to the up direction of the direction Z, also to the lateral direction X, and the longitudinal direction Y. Thereby, the positional deviation correcting device 2 and the gripping mechanism 3 return to the original position, as shown in FIG. 1.

Next, the gripping mechanism 3 will be described in detail with reference to FIG. 4 to FIG. 7C.

Figure 4:
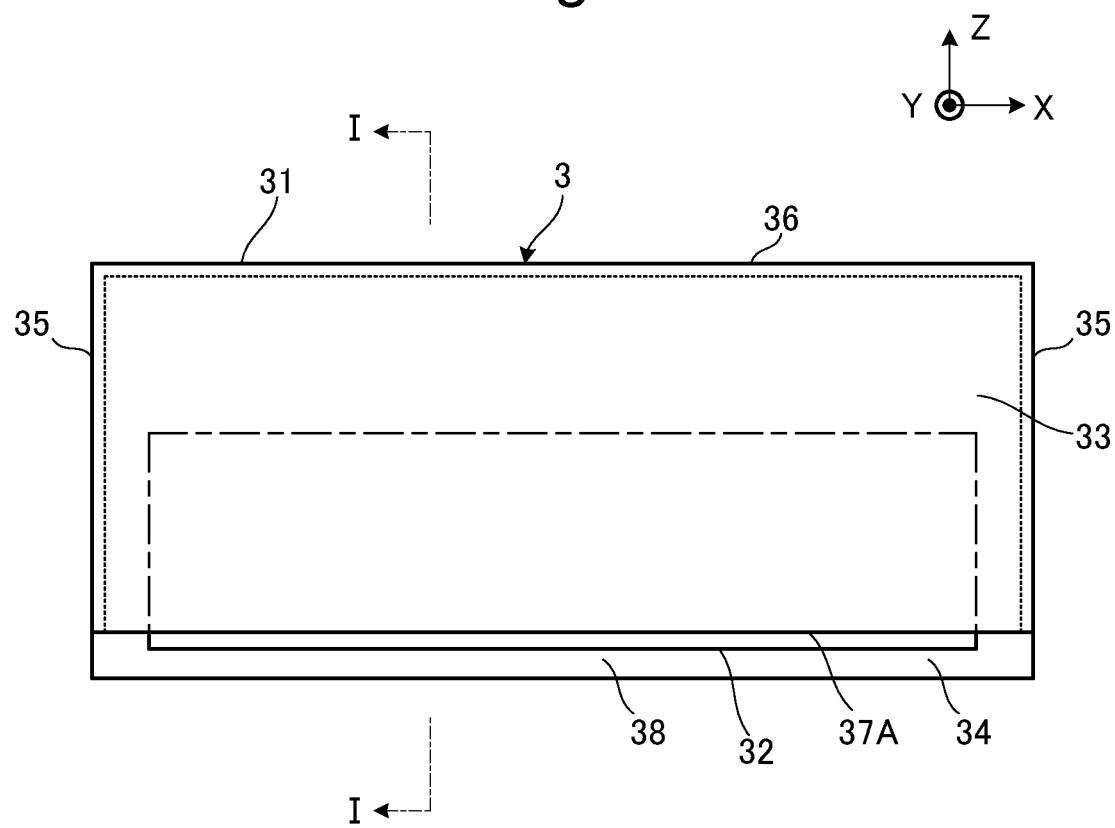
FIG. 4 is a side view schematically showing a gripping mechanism of the assembly device according to the present embodiment.
Figure 5:
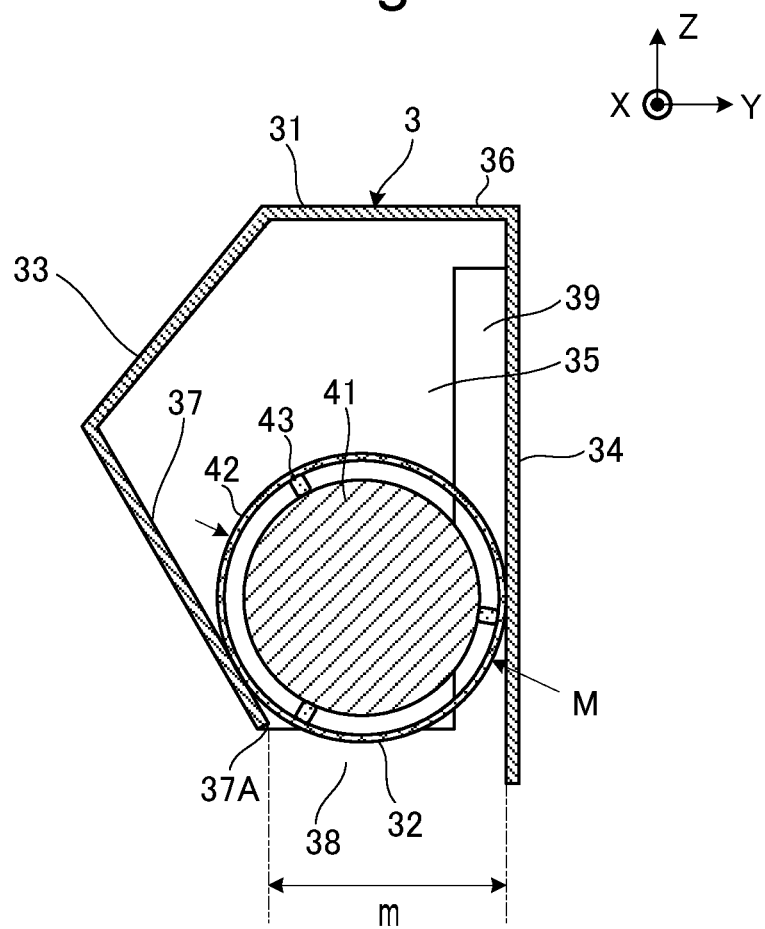
FIG. 5 is a cross-sectional view showing the gripping mechanism broken along line I-I in FIG. 4.
Figure 6:
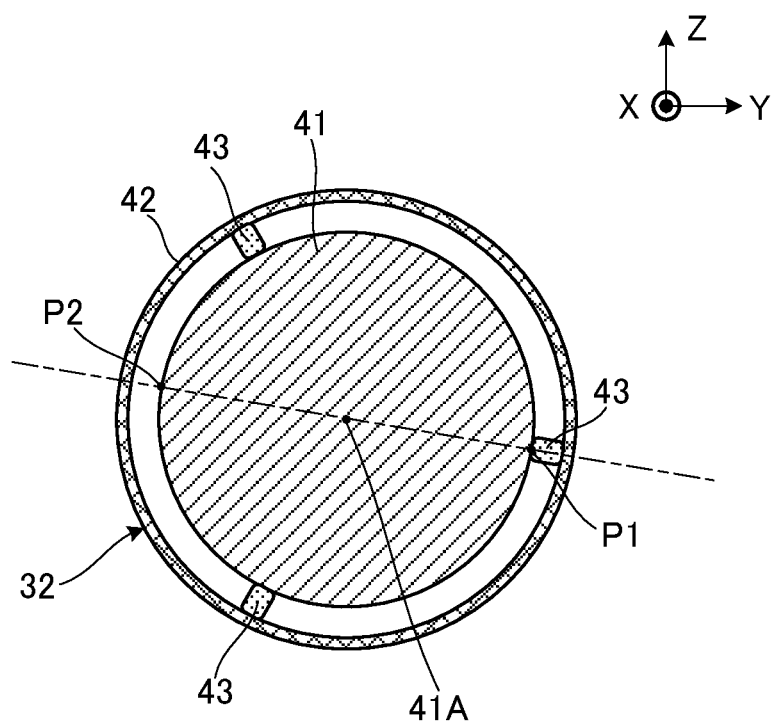
FIG. 6 is an enlarged cross-sectional view showing a rolling element of the gripping mechanism.
Figure 7A:
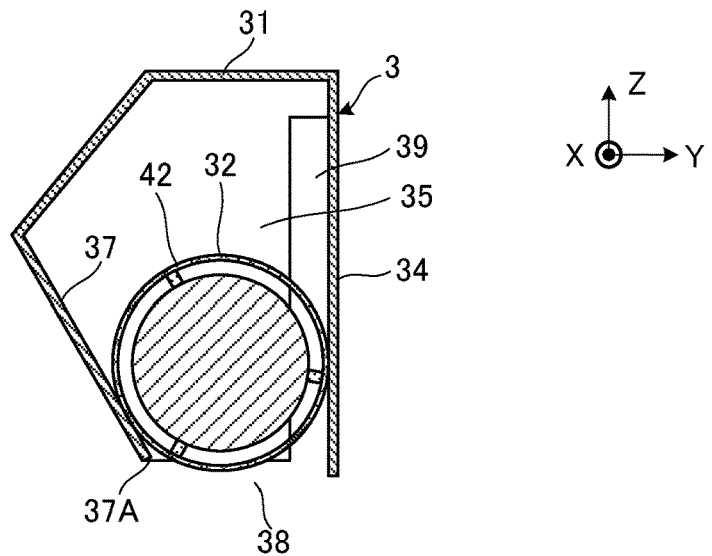
FIG. 7A, FIG. 7B, and FIG. 7C are cross-sectional views each showing an operating condition of the gripping mechanism.
Figure 7B:
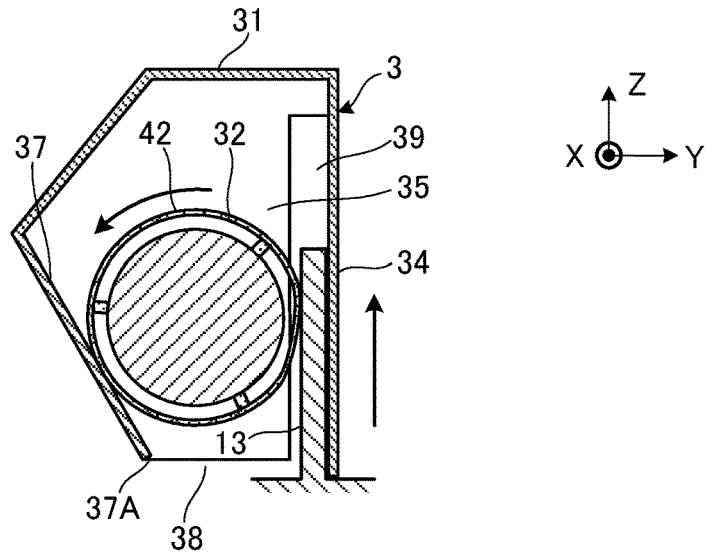
Figure 7C:
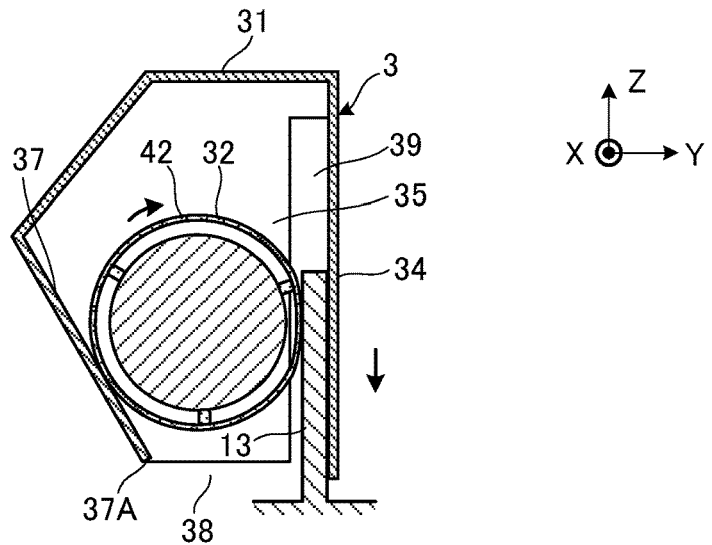

FIG. 4 is a side view schematically showing the gripping mechanism 3. FIG. 5 is a cross-sectional view showing the gripping mechanism 3 broken along the line I-I in FIG. 4. FIG. 6 is an enlarged cross-sectional view showing the rolling element 32 of the gripping mechanism 3. FIG. 7A, FIG. 7B, and FIG. 7C are cross-sectional views each showing an operating condition of the gripping mechanism 3.

As shown in FIG. 4 and FIG. 5, the gripping mechanism 3 includes a housing 31 and a rolling element 32. The housing 31 includes a bent wall 33 bent into an L shape, a facing gripping wall 34 facing the bent wall 33, and side walls 35 and upper walls 36 each connecting the bent wall 33 and the facing gripping wall 34. In other words, the side walls 35 are provided at both ends in a length direction of the housing 31, respectively. The housing 31 is formed by cutting and bending a metal plate, for example. The both ends in the lateral direction X of the housing 31 may be opened so that the side walls 35 may not be formed, and the both ends may have gaps. In such case, in the lateral direction X, the housing 31 may also be structured to have the opening where no side wall 35 is formed at only one side.

An inner peripheral surface at the lower side of the bent wall 33 is an inclined surface 37, which is inclined to the up-down direction (the direction parallel with the vertical direction) Z. The inclined surface 37 approaches the opposing gripping wall 34 as it goes downward. An end 37A of the inclined surface 37 and the facing gripping wall 34 facing the inclined surface 37 form an opening space 38 in therebetween. A width m of the opening space 38 is set so as to be narrower than an outer diameter (diameter) M of the rolling element 32. Thereby, the rolling element 32 is prevented from falling through the opening space 38. The facing gripping wall 34 is one example of the facing gripping part recited in What is claimed is.

At each of the side walls 35, a long-shaped notch part 39 extending upward from the opening space 38 is formed. The long-shaped notch part 39 is one example of the notch recited in What is claimed is.

As shown in FIG. 6, the rolling element 32 includes a core member 41 (forming the core of the rolling element 32), an annular member 42 provided around the core member 41, and a plurality of ribs 43 each of which is interposed between an outer periphery of the core member 41 and an inner periphery of the annular member 42, and forms a gap between the core member 41 and the annular member 42.

The core member 41 has a cylindrical shape extending in the lateral direction X (a rotation axis direction), and is made of a material having a sufficient weight, for example, metal. The sufficient weight indicates a weight by which the following is possible: when the rolling element 32 moves downward by its own weight and is sandwiched between the inclined surface 37 and the long-shaped notch part 39, the protrusion part 13 (the first component 11) being sandwiched between the rolling element 32 and the long-shaped notch part 39 can be held by the rolling element 32 and the long-shaped notch part 39; and even when, as shown in FIG. 3B, the robot 1 moves the positional deviation correcting device 2 and the gripping mechanism 3 to upward under just said state, the rolling element 32 and the long-shaped notch part 39 can continuously hold the protrusion part 13 (the first component 11) by the weight of the core member 41.

The annular member 42 has a tubular shape covering the outer periphery of the cylindrical-shaped core member 41, and is made of a deformable elastic material such as polyacetal resin. As will be described later, the protrusion part 13 of the first component 11 is gripped by being sandwiched in between the annular member 42 and the facing gripping wall 34 of the housing 31. Accordingly, it is preferable to set a friction coefficient of a surface of the annular member 42 and a friction coefficient of an inner surface of the facing gripping wall 34 large.

Each of the ribs 43 is, for example, a rectangular parallelepiped shape or a string shape extending in the lateral direction X, and is made of an elastic synthetic resin. The ribs 43 are bonded to the outer periphery of the core member 41 and to the inner periphery of the annular member 42. The core member 41 is connected to the annular member 42 by each of the ribs 43, and the core member 41, the annular member 42, and the each of the ribs are integrally supported. Since each of the ribs 43 has elasticity, the annular member 42 can be deformed even at a portion where each of the ribs 43 is provided.

Each of the ribs 43 is provided at one ("first position" recited in What is claimed is) of a pair of positions P1 and P2 on the outer periphery of the core member 41 and is not provided at the other one ("second position" recited in What is claimed is) of the pair of positions P1 and P2: the pair of positions P1 and P2 is where they become symmetrical with a center point 41A of the core member 41 as the center. With this arrangement, even while being fixed to the outer periphery of the core member 41 by the ribs 43, the annular member 42 is freely deformable at the other positions that face the positions at which the annular member 42 is being fixed by the ribs 43.

As shown in FIG. 7A, at the gripping mechanism 3, when the gripping mechanism 3 is positioned away from the first component 11 and upward as shown in FIG. 1, the rolling element 32 rolls obliquely downward on the inclined surface 37 by its own weight and is at the opening space 38 of the housing 31.

As shown in FIG. 7B, at the gripping mechanism 3, when the gripping mechanism 3 is moved to the down direction of the direction Z and the gripping mechanism 3 overlaps on the protrusion part 13 of the first component 11 as shown in FIG. 3A, the protrusion part 13 of the first component 11 enters into an inside of the housing 31 through the opening space 38 of the housing 31 and raises the rolling element 32, and the rolling element 32 rolls obliquely upward on the inclined surface 37 against its own weight and becomes separated from the facing gripping wall 34. The protrusion part 13 of the first component 11 enters between the rolling element 32 and the facing gripping wall 34.

When the gripping mechanism 3 is moved upwardly in the direction Z, at the gripping mechanism 3, as shown in FIG. 7C, the rolling element 32 rolls obliquely downward on the inclined surface 37 by its own weight, and the protrusion part 13 of the first component 11 is gripped between the rolling element 32 and the facing gripping wall 34. The rolling element 32 slightly rolls downward obliquely on the inclined surface 37 at right after a start of the movement of the gripping mechanism 3 in the up direction of the direction Z. Therefore, the protrusion part 13 of the first component 11 comes down slightly between the rolling element 32 and the facing gripping wall 34, but the protrusion part 13 of the first component 11 (which is held therebetween) is lifted up without falling.

As described above, the annular member 42 of the rolling element 32 is easy to deform, the annular member 42 can come in contact with the protrusion part 13 of the first component 11 with a wide area. Furthermore, because the friction coefficient of the surface of the annular member 42 and the friction coefficient of the inner surface of the facing gripping wall 34 are set large, the protrusion part 13 of the first component 11 is surely gripped in between the rolling element 32 and the facing gripping wall 34.

Thereafter, as shown in FIG. 3B and FIG. 3C, at the gripping mechanism 3, when the convex part 14 of the first component 11 is fitted into the recess part 15 of the second component 12, the protrusion part 13 of the first component 11 slightly raises the rolling element 32, and the rolling element 32 rolls obliquely upward on the inclined surface 37 and becomes slightly separated from the facing gripping wall 34. Under this state, when the robot 1 moves the positional deviation correcting device 2 and the gripping mechanism 3 to the left (or to right) of the lateral direction X as described above, the protrusion part 13 of the first component 11 is moved outside of the housing 31 through the long-shaped notch part 39 of the side wall 35 of the housing 31, and the protrusion part 13 of the first component 11 is released from the gripping mechanism 3.

Furthermore, as shown in FIG. 1, the robot 1 returns the positional deviation correcting device 2 and the gripping mechanism 3 to their original positions.

As described above, the gripping mechanism 3 according to the present embodiment has a simple structure in which the rolling element 32 rolling on the inclined surface 37 of the housing 31 is provided and the protrusion part 13 of the first component 11 is gripped in between the rolling element 32, rolling obliquely downward by its own weigh, and the facing gripping wall 34. Accordingly, the gripping mechanism 3 according to the present embodiment does not require a special power source, and is low cost and hardly breaks down.

The general chuck mechanism mentioned in the above Background section requires a power source such as a motor, a transmission mechanism for transmitting the power, and so on. This makes its structure complicated, costly, and easy to malfunction.

In contrast, the present embodiment can provide a gripping mechanism and an assembly device that has a simple structure, does not require a special power source, and can provide are low cost and hardly break down.

Modified Example 1

Figure 8:
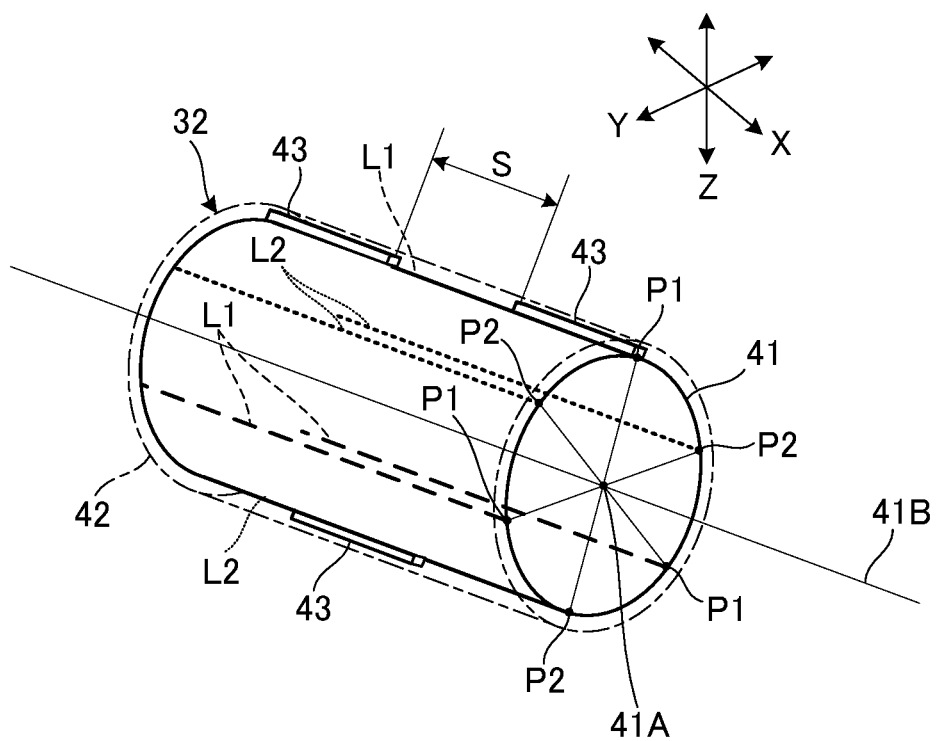
FIG. 8 is a perspective view showing a modified example of the rolling element in the gripping mechanism.

In a modified example 1, as shown in FIG. 8, the core member 41 of the rolling element 32 has the cylindrical-shape, and at least two ribs 43 are provided on a virtual line L1 with an interval S from each other. The virtual line L1 is parallel with a center line 41B of a longitudinal direction of the cylindrical shape of the core member 41 and is at the outer periphery of the core member 41. When it is assumed that the virtual line L1 passes through the position P1 of the pair of positions P1 and P2 (the pair of positions P1 and P2 being on the outer periphery of the core member 41 and facing each other through the center point 41A of the core member 41), one of the ribs 43 is provided at only a portion facing the interval S on a virtual line L2, the virtual line L2 being parallel with the center line 41B and being at the outer periphery of the core member 41. In such case, even if each of the ribs 43 suppresses deformation of the annular member 42 at the portions on the virtual line L1 where the ribs 43 are provided, the annular member 42 is freely deformable at the portion on the virtual line L2 facing the ribs 43 on the virtual line L1: this is because there are no ribs 43 on that portion. Conversely, even if each the rib 43 suppresses deformation of the annular member 42 at the portion on the virtual line L2 where the rib 43 is provided, the annular member 42 is freely deformable at a portion of the interval S facing the rib 43 on the virtual line L2: this is because there are no ribs 43 on the interval S. Compared to the case where the annular member 42 is fixed to the core member 41 all the way through its cylindrical shape, a degree of freedom in deformation of the annular member 42, as a whole, can be secured more. Thereby, the protrusion part 13 of the first component 11 is securely gripped at between the rolling element 32 and the facing gripping wall 34.

Modified Example 2

Figure 9:
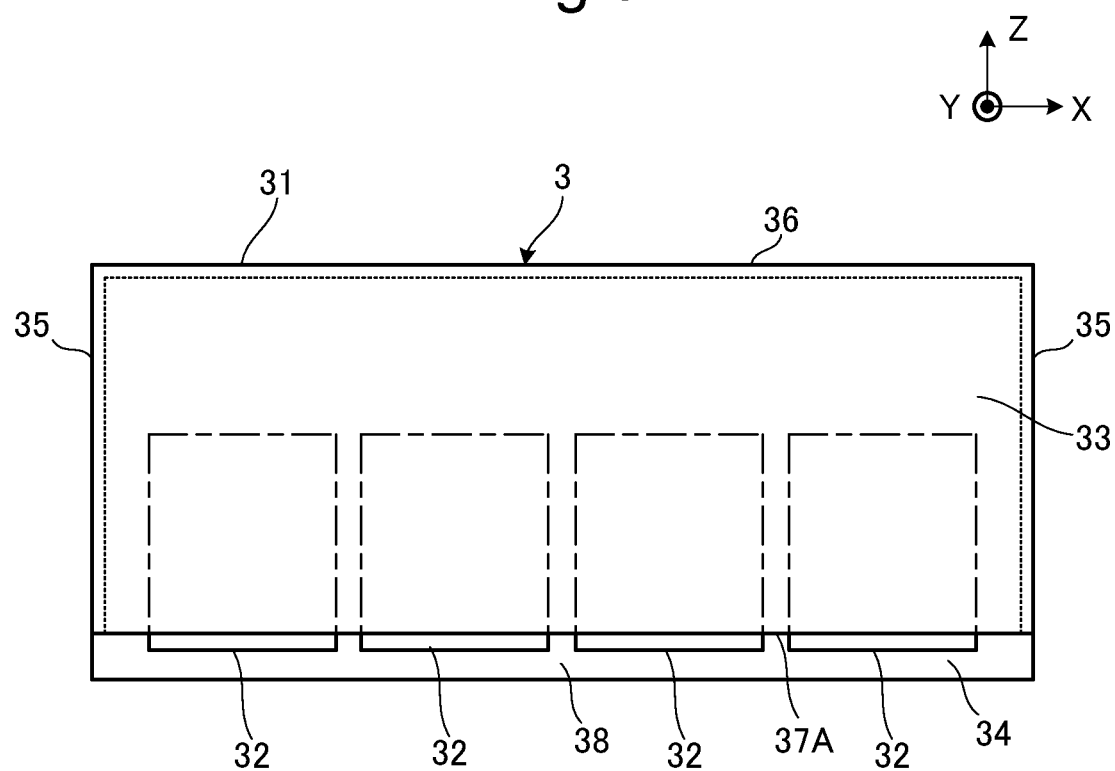
FIG. 9 is a side view schematically showing a modified example of the gripping mechanism.

As shown in FIG. 9, the gripping mechanism 3 in a modified example 2, more than one rolling element 32 is arranged side by side in the lateral direction X (the rotation axis direction) at the inside of the housing 31. All the rolling elements 32 freely roll obliquely upward and downward on the inclined surface 37 of the housing 31. The outer diameter M of each of all the rolling elements 32 is also set so as to be larger than a width m of the opening space 38, which is the opening between the end 37A of the inclined surface 37 and the facing gripping wall 34.

Upon insertion of the protrusion part 13 of the first component 11 into the inside of the housing 31 through the opening space 38 of the housing 31, the protrusion part 13 enters into each of the rolling element 32 and the facing gripping wall 34, and when the gripping mechanism 3 is moved to the up direction of the direction Z, the protrusion part 13 is gripped between the rolling element 32 and the facing gripping wall 34.

In such the configuration, by making the weights of the plurality of rolling elements 32 be different from each other, and making the friction coefficients of the surfaces of the annular members 42 of the rolling elements 32 be different from each other, it is possible to make a gripping force between the rolling element 32 and the facing gripping wall 34 be different.

Figure 10:
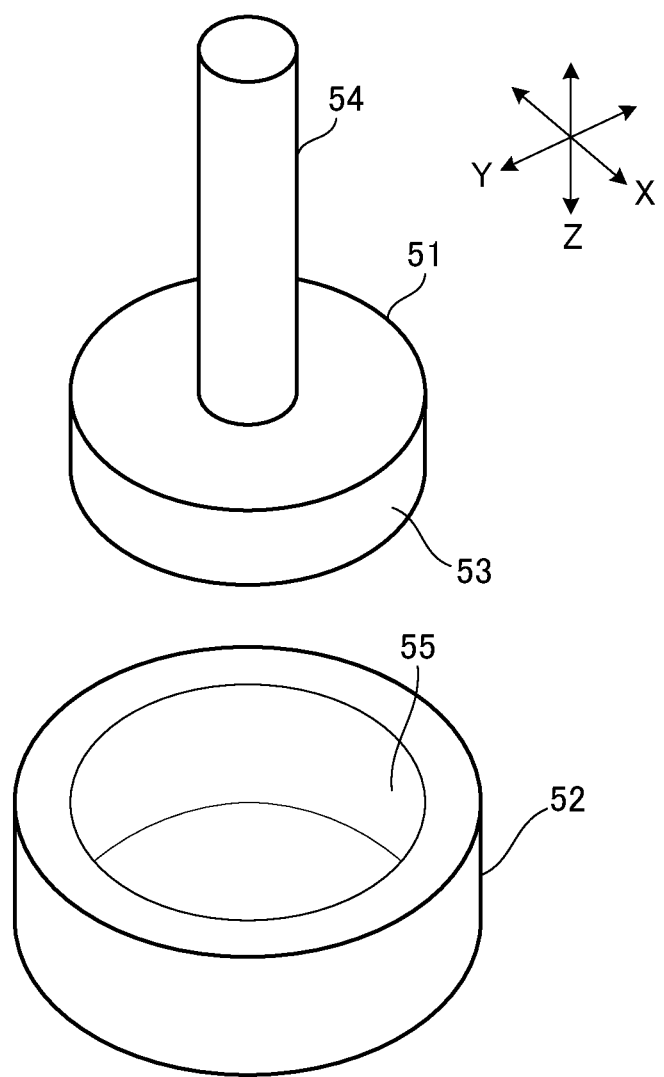
FIG. 10 is a perspective view showing a modified example of the first component and the second component.

The present embodiment has taken the first component 11 and the second component 12 shown in FIG. 2 as examples. The gripping mechanism 3, however, can grip components having different shapes. For example, a first component 51 and a second component 52 as shown in FIG. 10 can be assembled. The first component 51 includes a convex part 53 having the cylindrical shape and a protrusion part 54 having the cylindrical shape protruding upward from the convex part 53. The second component 52 has a circular recess part 55 into which the convex part 53 of the first component 51 is fitted.

Upon insertion of the protrusion part 54 of the first component 51 into the inside of the housing 31 through the opening space 38 of the housing 31, the protrusion part 54 enters between the rolling element 32 and the facing gripping wall 34, and when the gripping mechanism 3 is moved to the up direction of the direction Z, the protrusion part 54 is gripped between the rolling element 32 and the facing gripping wall 34. Under the state where the convex part 53 of the first component 51 is fitted into the recess part 55 of the second component 52, when the gripping mechanism 3 is moved to the left (or to right) of the lateral direction X, the protrusion part 54 of the first component 51 is moved outside of the housing 31 through the long-shaped notch part 39 of the side wall 35 of the housing 31, thus the protrusion part 54 of the first component 51 is released from the gripping mechanism 3.

Figure 11:
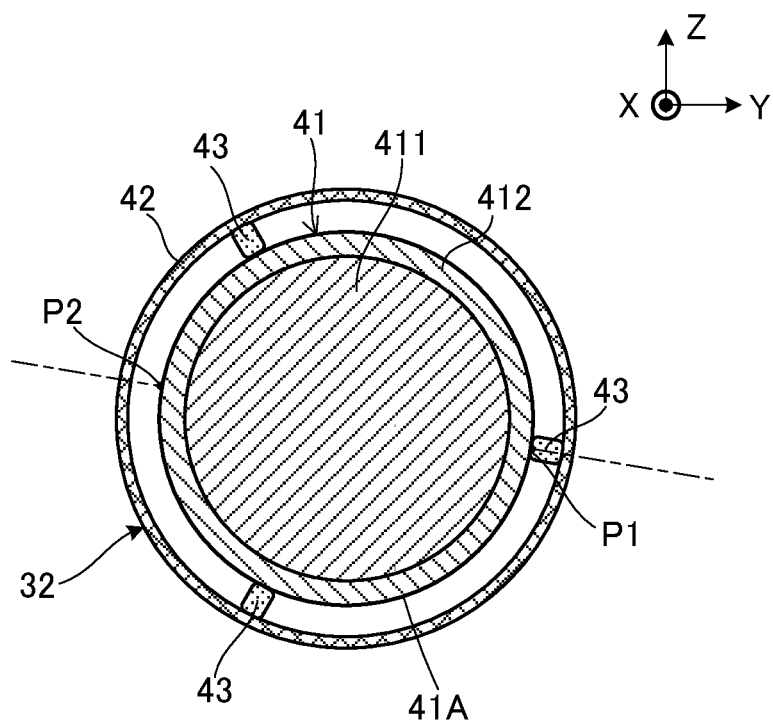
FIG. 11 is a cross-sectional view showing another embodiment of the rolling element in the gripping mechanism.

Furthermore, as shown in FIG. 11, the core member 41 may be formed to include a core portion 411 and an elastic part 412. The core portion 411 has the cylindrical shape extending to the lateral direction X (the rotation axis direction), and is made of, for example, a metal having the aforementioned sufficient weight. The elastic part 412 is the elastic member covering a circumferential surface of the core portion 411, and extending in the lateral direction X. By forming the core member 41 as such, the holding force upon holding the protrusion part 13 (the first component 11) by the rolling element 32 and the long-shaped notch part 39 can be improved.

The configurations shown in the above embodiment and the modified examples with reference to FIG. 1 to FIG. 11 are merely illustrative of the present disclosure and not intended to limit the present disclosure to the above particular configurations.

While the present disclosure has been described in detail with reference to the embodiments thereof, it would be apparent to those skilled in the art the various changes and modifications may be made therein within the scope defined by the appended claims.

What is claimed is:

1. A gripping mechanism comprising:
an inclined surface that is inclined to a vertical direction;
a rolling element that freely rolls obliquely upward and downward on the inclined surface; and
a facing gripping part that is arranged to face the inclined surface and forms an opening space with an end of the inclined surface, the opening space being narrower than a diameter of the rolling element,
wherein the rolling element includes:
a core member that has a cylindrical shape and forming a core of the rolling element;
an annular member that is provided around the core member and has elasticity; and
a plurality of ribs each of which is made of an elastic material, and is interposed between an outer periphery of the core member and an inner periphery of the annular member, and forms a gap between the core member and the annular member,
wherein the annular member is freely deformable at a position where the ribs are provided by an elasticity of the ribs, and
wherein each of the ribs is provided at one of a pair of positions on the outer periphery of the core member and is not provided at the other one of the pair of positions, the pair of positions are where they become symmetrical with a center point of the core member as the center, and even while the annular member is fixed to the outer periphery of the core member by the ribs, the annular member is freely deformable due to an absence of the ribs at the other positions that face the positions at which the annular member is being fixed by the ribs.

2. The gripping mechanism according to claim 1, wherein at both ends in a length direction of the inclined surface and the facing gripping part, a side wall is provided in between a side edge of the inclined surface and a side edge of the facing gripping part, the side wall being provided with a notch upwardly extending from the opening space, the notch is formed in the side wall at a position for moving a component gripped by the rolling element and the facing gripping part in the length direction from inside to outside of the housing formed by the inclined surface, the facing gripping part and the side wall.

3. The gripping mechanism according to claim 1, wherein a plurality of the rolling element is arranged side by side in a rotation axis direction.

4. The gripping mechanism according to claim 1, wherein the core member includes:
a core portion having a cylindrical shape extending in a rotation axis direction; and
an elastic portion covering a circumferential surface of the core portion, extending in a rotation axis direction of the core portion, and having elasticity.

5. An assembly device comprising:
the gripping mechanism according to claim 1; and
a driving member that moves the gripping mechanism to the vertical direction and to a direction orthogonal to the vertical direction.

* * * * *